United States Patent [19]

Fountain

[11] 4,049,221

[45] Sept. 20, 1977

[54] RELIEF OF INTER-COMPARTMENT DIFFERENTIAL PRESSURE IN AIRCRAFT

[75] Inventor: Claude Lloyd Fountain, Granada Hills, Calif.

[73] Assignee: Lockheed Aircraft Corporation, Burbank, Calif.

[21] Appl. No.: 644,278

[22] Filed: Dec. 24, 1975

[51] Int. Cl.² .............................................. B64C 1/18

[52] U.S. Cl. ................................... 244/118 R; 52/98; 137/68 R; 244/121

[58] Field of Search ........... 244/118 R, 118 P, 117 R, 244/163, 121; 98/1.5; 137/68 R, 68 A; 52/1, 98, 171; 49/141, 21, 31; 340/421, 273

[56] References Cited

U.S. PATENT DOCUMENTS

| | | | |
|---|---|---|---|
| 2,679,467 | 5/1954 | Sherts | 244/121 X |
| 3,332,175 | 7/1967 | Hawes et al. | 52/1 |
| 3,938,764 | 2/1976 | McIntyre et al. | 244/117 R |

*Primary Examiner*—Trygve M. Blix
*Assistant Examiner*—Barry L. Kelmachter
*Attorney, Agent, or Firm*—Billy G. Corber; Lowell G. Turner

[57] ABSTRACT

Apparatus for equalizing the pressure between two compartments of an airplane in the event of sudden depressurization of one of the compartments, and including a closure panel disposed across an opening between the two compartments and functioning as either a blowout panel to be forced bodily from the opening upon development of an excessive differential pressure between the two compartments, or as a frangible panel which is shattered in response to attainment of the undesired differential pressure, to thus allow very open communication between the compartments preventing damage to a wall therebetween.

7 Claims, 8 Drawing Figures

RELIEF OF INTER-COMPARTMENT DIFFERENTIAL PRESSURE IN AIRCRAFT

BACKGROUND OF THE INVENTION

This invention relates to improved aircraft safety equipment, for preventing damage to an aircraft upon sudden depressurization of one of several pressurized compartments while in flight.

A recent major aircraft crash in which many lives were lost was caused by accidental opening and loss in flight of a door to the cargo compartment of a wide-bodied jet aircraft. When this door opened, the sudden depressurization of the cargo compartment resulted in the development of such a high differential pressure between that compartment and a passenger compartment thereabove that the deck of the passenger compartment was deformed downwardly in a manner damaging control cables located beneath that deck. This caused complete loss of control of the aircraft, which then crashed. Similar difficulties might in some instances occur as a result of differential pressure induced deformation of a vertical bulkhead between two initially pressurized compartments if one of those compartments loses pressure in flight. For example, on a wide-bodied jet, depressurization of the cargo compartment on the lower level of the craft might cause bulging of the bulkhead between that compartment and a galley on the same level.

SUMMARY OF THE INVENTION

The present invention provides a novel safety arrangement for preventing such deformation of an inter-compartment wall in an aircraft upon loss of pressure in a compartment at one side of the wall. In this connection, the term "wall" as used in the present application is intended to be interpreted broadly as including any type of wall structure separating two compartments, regardless of the direction in which the wall may extend, and in particular including both horizontal deck structures and vertical bulkheads.

To achieve this safety purpose, I provide a closure which normally extends across an opening between two vertically or horizontally adjacent compartments, and so design that closure as to automatically and very rapidly open in response to the attainment of a predetermined abnormal differential pressure between the two compartments to thus allow very free and relatively unrestricted flow of air from the compartment with higher pressure to the compartment with lower pressure, in a manner almost instantaneously equalizing the pressure between the compartments before any structural damage to the inter-compartment wall can occur. In one form of the invention, the closure may take the form of a frangible panel, typically formed of glass, an appropriate resinous plastic material, or the like, with the panel being automatically broken in response to attainment of the unwanted differential pressure to thus provide full communication through the opening initially blocked by the closure. Preferably, the frangible panel is constructed to shatter into many pieces when broken, so that the remains of the panel are not of sufficient size to interfere in any way with subsequent free flow of air between the compartments. The panel may be designed to be broken directly by the force exerted against the panel by the pressurized air itself, or indirectly by a mechanism which responds to a change in differential pressure to act against the panel, breaking it.

More particularly, the indirect breaking action may be attained by a striker which responds to the change in differential pressure to mechanically strike the frangible panel at a location and with a force causing it to shatter. This effect may be enhanced by or combined with the more direct action of the pressurized air against the panel to assure immediate breakage of the panel when depressurization of one of the compartments occurs.

In another form of the invention, the panel may be of sufficient strength to maintain its integrity when one of the compartments is depressurized, and to then function as a blowout panel which is forced bodily from the opening which it initially closes and without disintegration.

In any of these arrangements, it is desirable that means be provided for protecting the closure against damage in normal use, which means may take the form of a grill or grills installed at one or both sides of the panel and against which cargo items or other elements in the compartments can engage without breaking or damaging the panel.

BRIEF DESCRIPTION OF THE DRAWINGS

The above and other features and object of the invention will be better understood from the following detailed description of the typical embodiments illustrated in the accompanying drawings in which.

DESCRIPTION OF THE PREFERRED EMBODIMENTS

Figure 1:
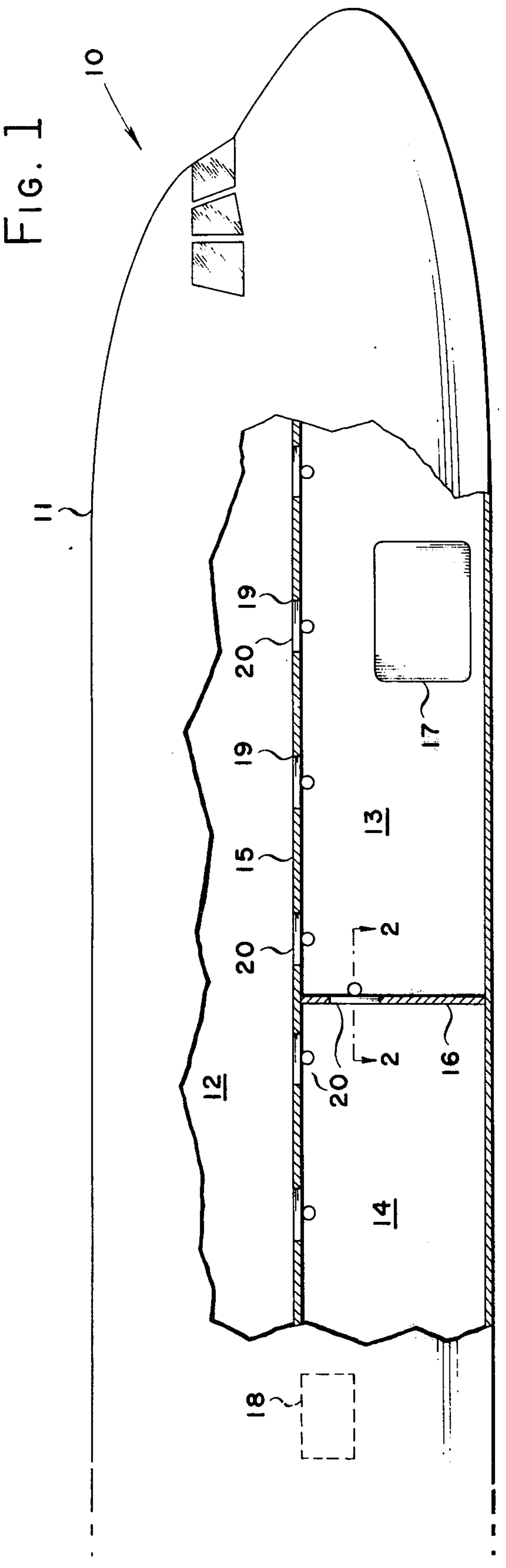
FIG. 1 is a diagrammatic representation of an aircraft having walls containing pressure relief panels in accordance with the teachings of the present invention.

Referring to FIG. 1; there is illustrated at 10 an aircraft having a fuselage 11 which is divided interiorly into a number of separate compartments, including an upper passenger compartment 12, a lower cargo compartment 13, and a galley 14 on the same level as the cargo compartment. A horizontal deck 15 defines the floor of passenger compartment 12, and the ceiling of the other two compartments 13 and 14, with a vertical bulkhead 16 extending between and separating the two lower level compartments 13 and 14. When the aircraft is on the ground, access is provided to each of the compartments through doors, hatch covers, or the like, including in the case of the cargo compartment 13 a door or hatch cover represented diagrammatically at 17. All of the compartments within the craft are pressurized in flight to a value substantially higher than the ambient pressure surrounding the plane at high elevation. The pressurizing equipment is diagrammatically represented in FIG. 1 at 18. Normally, this equipment maintains essentially the same pressure in the lower compartments 13 and 14 as in the upper compartment 12.

For equalizing the pressure above and beneath deck 15, and at opposite sides of bulkhead 16, in the event of accidental depressurization of one of the compartments, the deck 15 and bulkhead 16 both contain a number of typically rectangular openings 19 of substantial size, with each of which there is associated one of a number of pressure relief units 20. One of these pressure relief units 20 is illustrated in FIG. 2, being represented in that figure as connected into the vertical bulkhead 16, though it is to be understood that the showing of FIG. 2 can also be considered as representing a cross section through one of the pressure relief units in deck 15.

Figure 2:
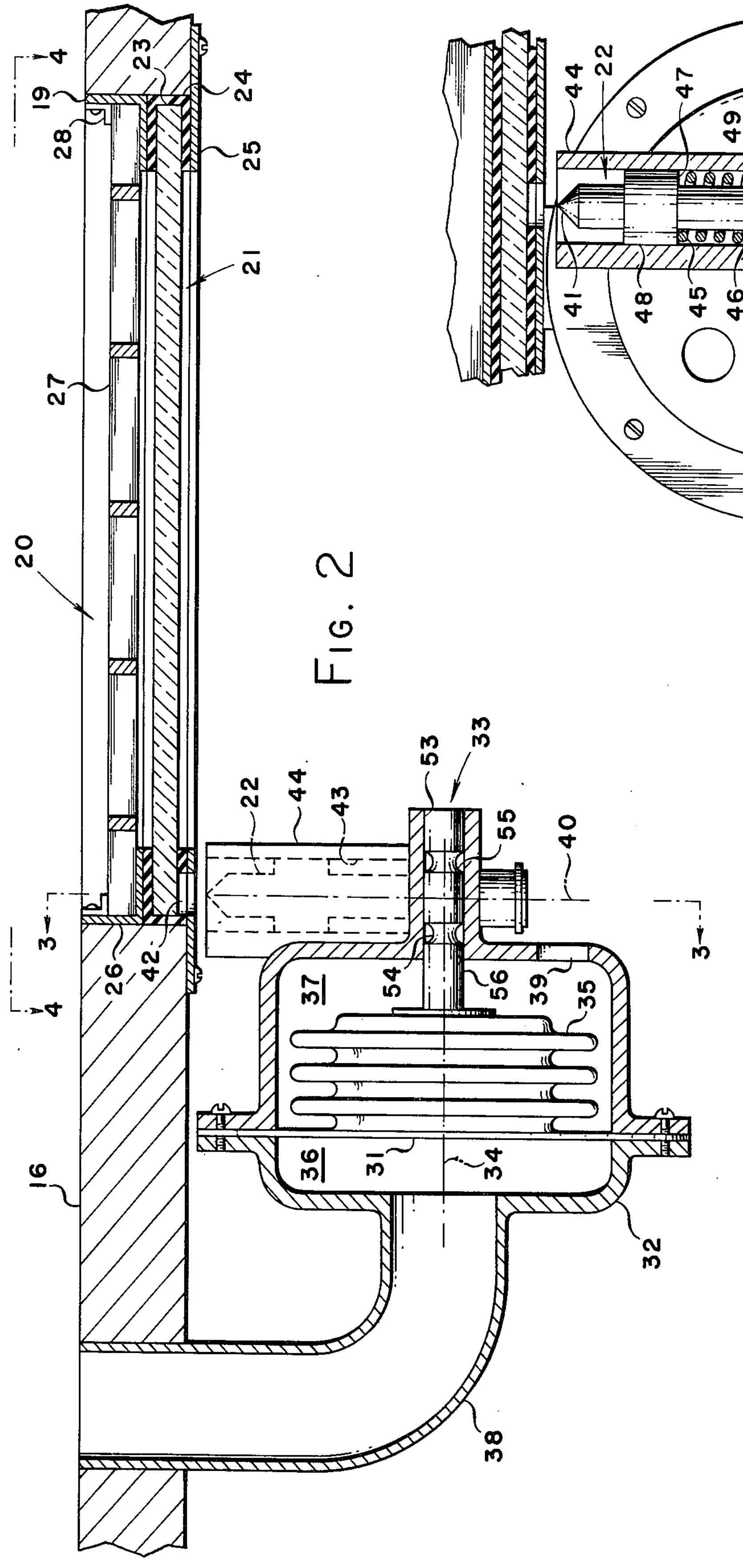
FIG. 2 is an enlarged section through one of the frangible panel assemblies of FIG. 1, and typically taken on the line 2—2 of FIG. 1.

In FIG. 2, there is connected into the rectangular opening 19 in wall 16 a correspondingly rectangular frangible closure panel 21 which may take the form of a flat plate of a material which is extremely brittle and adapted to shatter into many pieces when impacted by a mechanical striker 22 in a manner which is to be described at a later point. Any suitable material capable of shattering in this manner may be employed, such as a highly tempered glass, frangible expanded rigid polyurethane, expanded polystyrene, acrylic sheet material, or the like. At the same time, however, the panel 21 should have sufficient thickness and strength to maintain its integrity effectively under such vibrational and other forces as occur in flight and in normal maintenance and operation of the aircraft.

Figure 4:
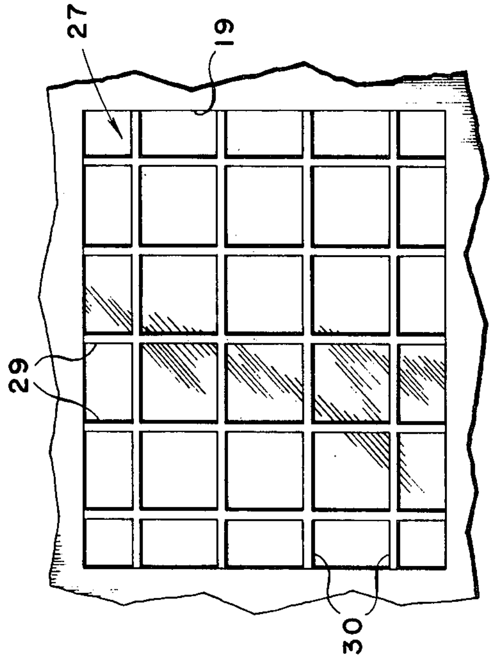
FIG. 4 is a reduced scale view taken on line 4—4 of FIG. 2.

The edge 23 of frangible panel 21 may be cushioned by confinement within a gasket 24 of U-shaped cross sectional configuration as illustrated, with this gasket and the periphery of the panel being confined within aperture 19 by appropriate frame elements, such as a rectangular face plate 25 at one side of wall 16 and a frame 26 of angle iron cross section secured in opening 19 at the other side of the panel. A grill 27 may be mounted at one side of panel 21, as by reception within frame 26, and retention therein by appropriate holding elements represented at 28. As seen in FIG. 4, the grill may include a number of parallel rigid elements 29 extending in a first direction and a second set of parallel rigid elements 30 extending in a second direction perpendicular to elements 29, and all rigidly secured together of formed integrally of a single piece of material, and with grill 27 having greater strength and rigidity than panel 21 to protect the panel against breakage by contact with articles or persons within one of the compartments. It is contemplated that two such grills may be provided at both sides of the panel 21 in FIG. 2 if desired, to protect the panel from both of its sides.

The actuation of striker 22 is controlled automatically by changes in pressure differential between the opposite sides of wall 16. Normally, the pressure is the same on both sides of this wall. If the pressure at one side of this wall drops a predetermined amount, a bellows 31 contained within a bellows housing 32 appropriately secured to one side of wall 16 is actuated by the change in differential pressure to move a connected shaft 33 along the axis 34 of that shaft to an extent releasing striker 22. Bellows 35 divides the interior of housing 32 into two chambers 36 and 37, the first of which communicates through a tube 38 with the upper side of wall 16 as viewed in FIG. 2, and the second of which (chamber 37) communicates with the second side of wall 16 through apertures 39 in housing 32.

The stiker 22 is appropriately mounted for movement along a second axis 40, essentially perpendicular to the first mentioned axis 34, toward and away from an edge portion of panel 21. The preferably pointed hammer end 41 of striker 22 is movable through apertures 42 in elements 23 and 25 to directly contact panel 21. The striker may be guided for this movement in any appropriate manner, as by reception within a cylindrical guideway 43 formed in a projection 44 on bellows housing 32, with the striker being yieldingly urged by a coil spring 45 axially toward panel 21 with substantial force. The compression spring 45 is received about a reduced diameter portion 46 of striker 22, and bears at opposite ends against a shoulder 47 on an enlarged diameter portion 48 of the striker and an internal transverse shoulder 49 formed in portion 44 of the bellows housing.

Figure 3:
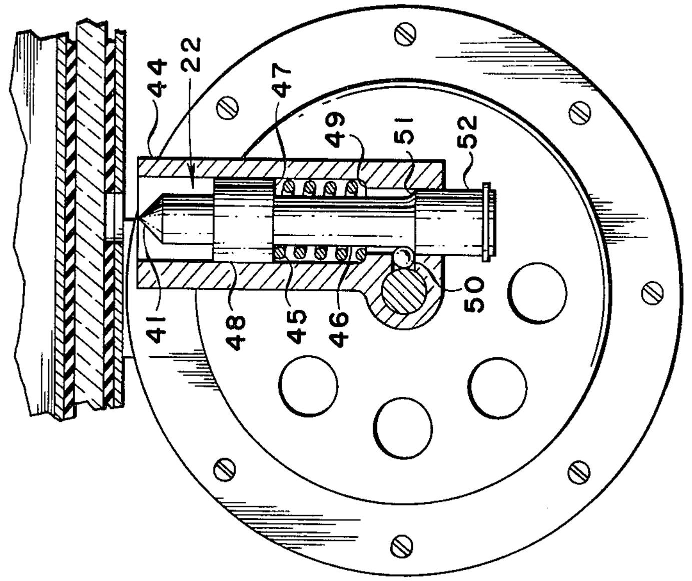
FIG. 3 is a transverse section taken on line 3—3 of FIG. 2.

The striker is releasably retained in its cocked or retracted position of FIGS. 2 and 3 by engagement of a ball detent 50 with an annular shoulder 51 formed on striker 22 at the juncture between the reduced diameter portion 46 of the striker an end enlarged diameter portion 52. The previously mentioned bellows actuated shaft or rod 33 is guided for movement along its axis 34 by reception within a cylindrical guideway 53, and contains two axially spaced annular grooves 54 and 55, with an external cylindrical surface 56 of shaft 33 therebetween. In the normal FIG. 2 position of shaft 33, the cylindrical surface 56 of that shaft engages ball 50 in a manner retaining it close enough to axis 40 of the striker to engage shoulder 51 of the striker and hold it in a cocked position. If, however, a change in differential pressure causes actuation of shaft 33 far enough in either direction to move one of the grooves 54 or 55 into a position opposite detent ball 50, that ball is then free to move into the corresponding groove and slightly away from axis 40 and toward axis 34, sufficiently to free the striker for movement under the influence of coil spring 45 toward and into engagement with the periphery of panel 21 to break it.

To summarize the functioning of the safety equipment of FIGS. 1 to 4, if while in flight the hatch cover 17 of cargo compartment 13 accidentally opens or is lost, the resultant sudden depressurization of cargo compartment 13 causes actuation of each of the bellows elements 31 associated with any of the openings in the vertical bulkhead 16 or in the portion of deck 15 which is above the cargo compartment. This is true because the compartments 12 and 14 tend to remain pressurized to their initial condition, thereby applying a greater pressure to the interior of each bellows 25 than to its exterior, and moving the connected bellows shaft 33. The parts are desirably so constructed and related that the bellows release their associated strikers 22 in response to development of a relatively small differential pressure, desirably not more than about 1 pound per square inch, so that the strikers hit their panels 21 almost instantaneously with the initiation of the depressurizing effect in compartment 13. The springs 45 actuate the strikers with sufficient force to assure immediate shattering of all of the panels 21 of the compartment 13, to in this way instantaneously open all of the openings 19 for rapid flow of pressurized air from compartments 12 and 14 into compartment 13. This equalizes the pressure above and beneath deck 15, and at opposite sides of bulkhead 16, before sufficient differential can develop at the opposite sides of the deck or bulkhead to deform or bulge it inwardly toward cargo compartment 13, thereby preventing any damage to control cable or other operating parts or structural members which might cause the plane to become partially or wholly out of control. The grills 27 are sufficiently open to avoid substantial interference by these grills with the full flow of air through openings 19 when the panels are broken.

If the depressurization occurs in compartment 12 or compartment 14 rather than compartment 13, the operation of the bellows unit is reversed, to move shaft 33 of each of the units 20 leftwardly as viewed in FIG. 2, so that the second of the grooves 55 receives detent ball 50 to again release the striker for breaking an associated panel. In this way, each of the units 20 responds to a decrease in pressure at either of its sides to break its panel 21 and allow free flow of air between the two compartments previously separated by that panel.

Figure 5:
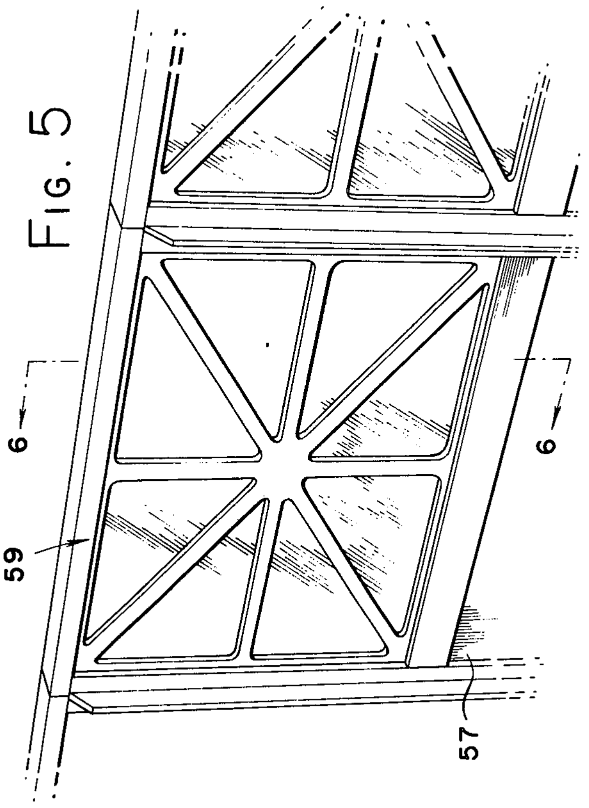
FIG. 5 is a fragmentary perspective view of a bulkhead containing another form of a pressure relief panel constructed in accordance with the invention.
Figure 7:
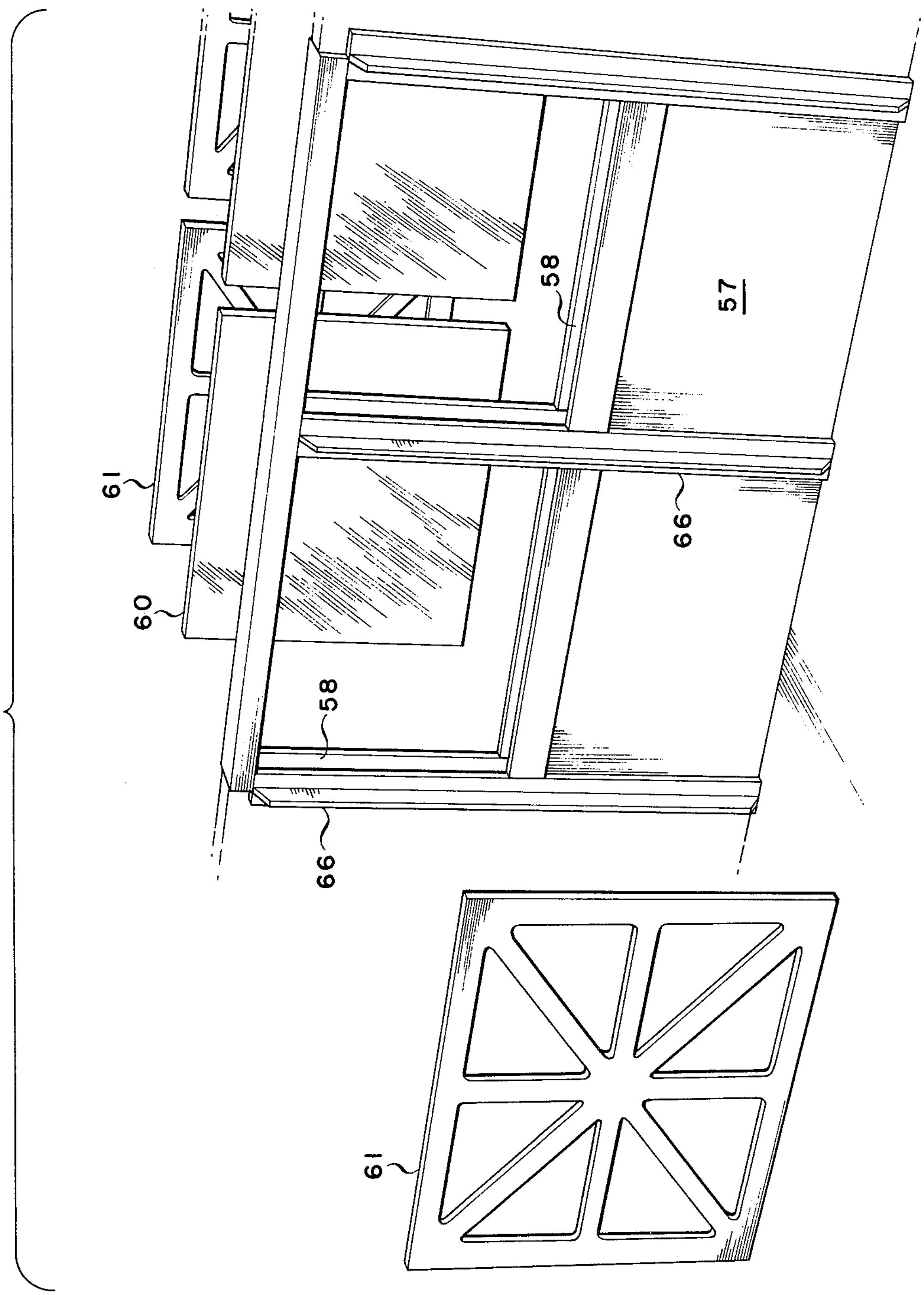
FIG. 7 is an exploded perspective view representing the construction of the FIG. 4 arrangement.
Figure 6:
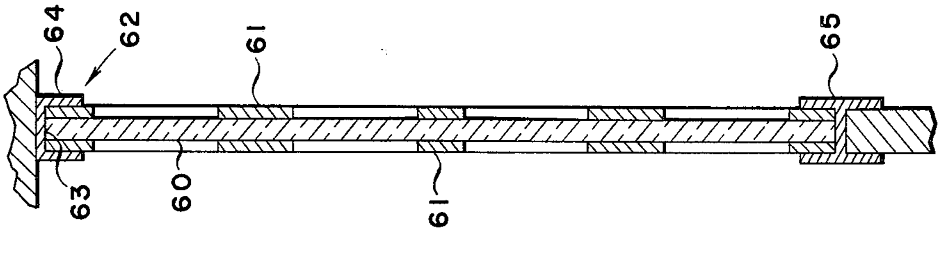
FIG. 6 is an enlarged fragmentary vertical section taken on line 6—6 of FIG. 5.

FIGS. 5 to 7 illustrate another form of the invention, in which a wall 57, which may be either a vertical bulkhead or a horizontal deck as previously discussed, separates two vertically or horizontally adjacent compartments, and contains a number of typically rectangular openings 58 within which pressure relief panel assemblies 59 are mounted. Each of theses assemblies 59 include a rectangular panel 60 dimensioned to extend across the opening 58 which it closes, and having two grills 61 received at opposite sides of the panel. These three elements 61-60-61 are confined in sandwich relationship within an appropriate frame structure 62, which may be constructed to define a channel shaped recess 63 receiving the periphery of the three elements 61-60-61. In the particular arrangement illustrated, the frame 62 includes at the top of each of the openings 58 a downwardly facing channel element 64, and at the bottom of each opening 58 an element 65 of H-shaped cross section as seen in FIG. 6. The channel recesses at the opposite sides of each opening 58 may be formed by providing at those locations vertical elements of T shaped cross section, with flanges of these elements 66 overlapping edges of the grills 61 at both sides of panel 57. All of these frame elements 64, 65, and 66 are desirably secured rigidly to wall 57, to remain in place at all times and even after development of excessive pressure differential between adjacent compartments.

The panel 60 of FIGS. 5 to 7 is frangible, and adapted to shatter in the manner of the panel 21 of the first form of the invention. However, in FIGS. 5 to 7 the panel 60 is made sufficiently brittle to shatter in response to the force exerted by the pressurized air itself, when a pressure differential develops, without the necessity for a striker to initiate or produce such shattering. More particularly, as the pressure at one side of the panel 60 decreases, the pressure at its opposite side tends to cause the panel and connected grill elements 61 to bulge in one direction, and the brittle character of panel 60 is such as to cause it to shatter immediately upon commencement of this bulging deformation. The many pieces of the shattered panel 60 are blown by the rapidly moving pressurized air through the openings in one of the grill elements 61, and into the depressurized compartment. Such instantaneous release of the pressure differential prevents damage to wall 57 and avoids adverse effects on cables or other operational equipment.

Figure 8:
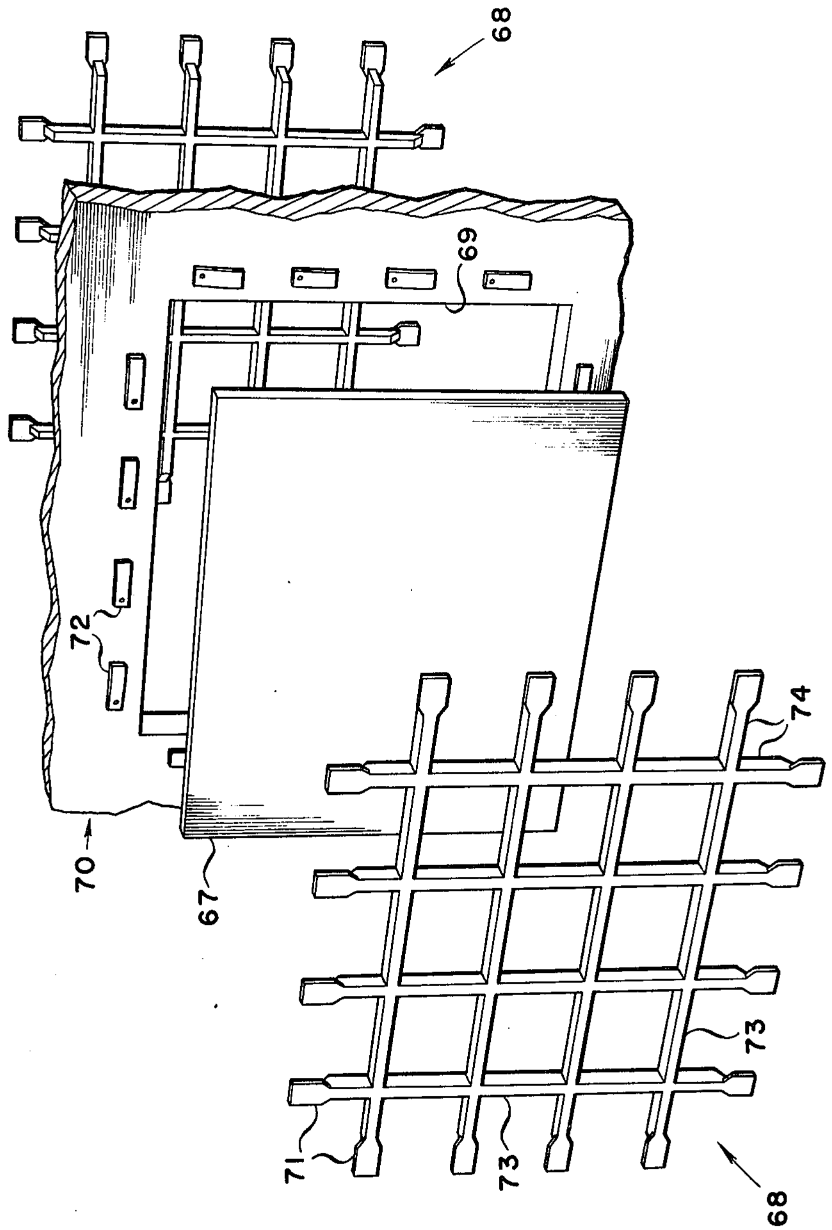
FIG. 8 is an exploded perspective view similar to FIG. 7 but showing another variation of the invention.

FIG. 8 illustrates in exploded form another arrangement which is similar to that of FIG. 7 except that the panel 67 which is sandwiched between and in engagement with two grills 68 is not frangible, but rather is of sufficient strength to maintain its integrity without shattering upon imposition of the increased differential pressure to the panel. The sandwich consisting of elements 67 and 68 is releasably retained within opening 69 in bulkhead or deck 70, by reception of flat leaf spring end portions 71 on the grill rods 73 within receptacle sockets in mounting brackets 72 secured to the opposite sides of the wall 70. As will be understood, when an excessive pressure differential develops between the opposite sides of the wall, the force exerted by this pressurized air against panel 67 pushes that panel out of opening 69 along with one of the grills 68, which is automatically released from its retaining brackets 72 by bending of the spring ends 71, allowing them to slip out of the socket recesses of those brackets. After the panel and one of the grills has moved out of opening 69 in this manner, free flow of air through that openings is permitted to equalize the pressure on the opposite sides of the wall and prevent damage to the wall as discussed. The spring ends 71 may be formed as separate leaf springs, appropriately welded or otherwise secured to the ends of the main rigid grill rods or bars 73, with the extremities 74 of those rigid rods desirably being of a length to rest against the wall 70 adjacent its opening 69 in a relation transmitting any load forces exerted by baggage or otherwise against the grills directly to the wall without damage to panel 67.

While certain specific embodiments of the present invention have been disclosed as typical, the invention is of course not limited to these particular forms, but rather is applicable broadly to all such variations as fall within the scope of the appended claims: *claim:*

1. In an aircraft having a fuselage containing a plurality of compartments which are pressurized when the aircraft is in flight, the improvement comprising:

a wall located between and separating two of the pressurized compartments and containing an opening through which those two compartments may communicate;

a frangible closure extending across the opening and at least partially closing off communication therethrough;

a single striker operable to strike said frangible closure with a force sufficient to break it and thereby permit the rapid flow of air between the two compartments; and spring means yieldingly urging said striker along a path toward said frangible closure with a force sufficient to break said closure;

detent means for holding said striker in a retracted position against the force of said spring means;

means communicating with both compartments and movable in either of two opposite directions, responsive to an increase in pressure differential between the two compartments resulting from a presssure decrease in either compartment to actuate said detent means and release said striker for movement by said spring means and breaking said frangible closure;

whereby the pressure is equalized on opposite sides of said wall, preventing damage thereto.

2. The improvement as recited in claim 1, including grillwork at one side of said closure preventing damage thereto from within one of said compartments.

3. The improvement as recited in claim 1, further including a grill extending across one side of said closure and protecting it against accidental breakage.

4. In an aircraft having a fuselage containing a plurality of compartments which are pressurized when the aircraft is in flight, the improvement comprising:

a wall located between and separating two of the pressurized compartment and containing an opening through which the two compartments may communicate;

a frangible closure extending across the opening and at least partially closing off communication therethrough;

a striker movable along a path to strike said frangible closure;

spring means yieldingly urging said striker toward said frangible closure with a force sufficient to break said closure, and thereby permit the rapid flow of air between the two compartment;

a detent ball engageable against a shoulder of said striker to retain said striker in a retracted position against the force of said spring means; and a differential pressure actuated element movable essentially transversely of said striker and containing two spaced grooves for partially receiving said ball and releasing said striker in response to the decrease in pressure in either of the two compartments relative to the other compartment.

5. In an aircraft having a fuselage containing a plurality of compartments which are pressurized when the aircraft is in flight, the improvement comprising:

a wall located between and separating two of the pressurized compartments and containing an opening through which those two compartments may communicate;

a closure extending across said opening and at least partially closing off communication therethrough, and constructed to open automatically in response to an increase in pressure differential between the two compartments, to thereby allow a rapid flow of air between the compartments equalizing the pressure at opposite sides of said wall and preventing damage thereto;

said closure being a blowout panel which is adapted to be forced bodily from the opening by the differential pressure;

a grill extending across one side of said closure for preventing damage thereto; and a connector means yieldingly securing said grill to said wall and being releasable by the force of the differential pressure to free said grill and said panel for movement away from said wall.

6. The improvement as recited in claim 5, in which said connector means include resilient elements on said grill, and receptacles on said wall for receiving said elements and from which said elements are releasably by resilient deflection.

7. In an aircraft having a fuselage containing a plurality of compartments which are pressurized when the aircraft is in flight, the improvement comprising:

a wall located between and separating two of the pressurized compartments and containing an opening through which those two compartments may communicate;

a closure extending across the opening and at least partially closing off communciation therethrough, and constructed to open automatically in response to an increase in pressure differential between the two compartments, to thereby allow a rapid flow of air between the compartments equalizing the pressure at opposite sides of said wall and preventing damage thereto; and a grill on each side of said closure connected to said wall and releasable therefrom by said differential pressure to free said closure for separation from said wall.

* * * * *